Dec. 10, 1935.  E. C. HALTEMAN  2,024,000

CALKED PIPE JOINT

Filed Dec. 11, 1934

INVENTOR,
Ellsworth C. Halteman,
BY Howard P. Smith,
HIS ATTORNEY

Patented Dec. 10, 1935

2,024,000

UNITED STATES PATENT OFFICE 2,024,000

CALKED PIPE JOINT

Ellsworth C. Halteman, Dayton, Ohio

Application December 11, 1934, Serial No. 756,996

2 Claims. (Cl. 285—115)

This invention relates to new and useful improvements in calked pipe joints.

Under the present method of connecting horizontal soil pipe and like pipe sections by the use of hemp fiber or oakum packing with poured lead calking, these sections in time will sag at the joints because it is not possible to place the packing in them in a sufficiently tight manner.

It is therefore one of the principal objects of my invention to provide a calking means that will hold the pipe sections together in alinement so that they will not sag in use.

It is a further object of the invention to provide a calking ring which, when introduced into the bell at the joint and given a blow or series of blows on its outer end, will communicate the same to the inner calking end of the ring, so that both sections of the pipe may be calked simultaneously and in a manner that will not permit them to sag.

For the purpose of achieving the foregoing results, my calking means is preferably made up of two semi-circular pre-cast sections that are formed with an upper and a lower peripheral groove beyond which each section tapers inwardly to provide a wedging surface.

The two semi-circular sections of the ring are connected together by molten lead which is also poured over the ends of the connected ring, flowing into the peripheral grooves therein to securely anchor a top and a bottom calking sleeve thereto. This calking ring is then slipped over the end of the pipe section that is introduced into the bell portion of another pipe section, and a series of blows administered to the outer lead end of the ring by a conventional calking tool.

These blows will not only calk the outer end of the joint, but will be transmitted through the swedging cast-iron center of the ring to its inner lead end to simultaneously calk both ends of the joint. And since the lead will be forced tightly into each end of the joint by the peening blows applied to the outer end of the assembled ring, the pipe sections connected by it will be maintained in constant alinement.

Figure 2:
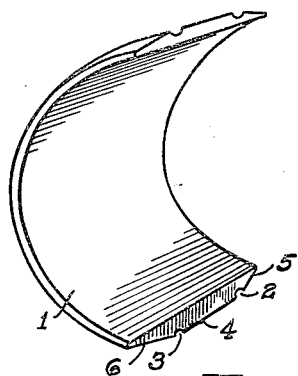
Figure 1:
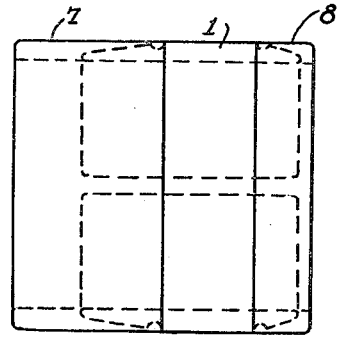
Figure 3:
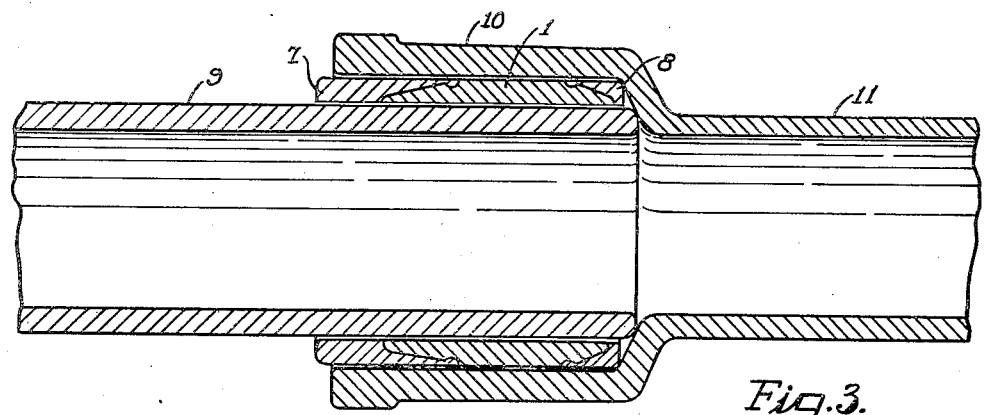
Figure 4:
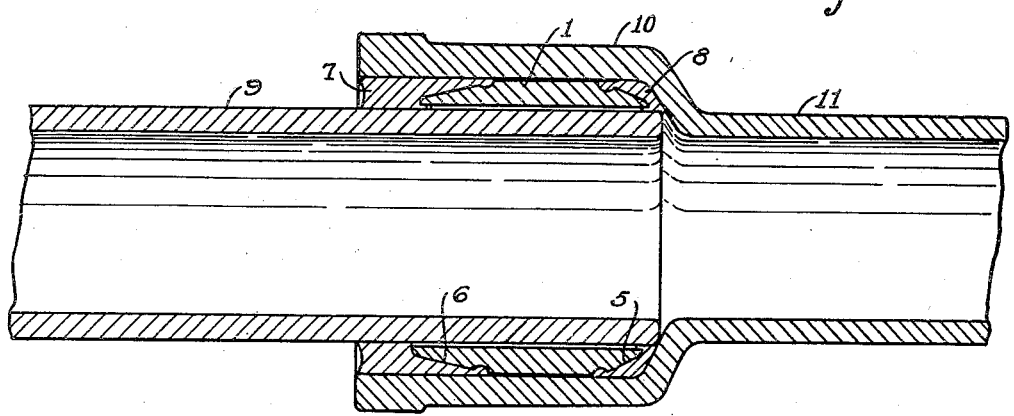

In the accompanying drawing illustrating my invention, Figure 1 is a side elevational view of the assembled calking ring before it is inserted in the bell portion of a pipe section. Figure 2 is a perspective view of one of the semi-circular cast iron swedging sections of the calking ring. Figure 3 is a longitudinal, sectional view of two pipe sections, showing my calking ring in place in the bell portion of one before the calking operation. And Figure 4 is a similar view, showing those sections after the calking operation has been completed through blows applied to the outer end of the assembled ring.

Referring to the accompanying drawing, my calking means comprises a central ring to which calking or lead sleeve ends are applied. The ring consists of two semi-circular sections 1, 1, which are pre-cast of cast iron or other suitable metal. Each section 1 is formed with an inner peripheral groove 2 and an outer peripheral groove 3, leaving a wide strip 4 of metal between them.

Beyond the groove 2 each ring section 1 has a narrow marginal edge portion that tapers inwardly to form a wedging surface 5. The marginal edge portions of the ring sections beyond the grooves 3 are wider than their opposite edge ports 5, but like the latter taper inwardly to provide wedging surfaces 6.

These semi-circular sections 1, 1 are united by molten lead at their meeting edges to provide a swedging cast iron center for a calking ring. Lead in its molten state is then applied to each end of the united ring to form a wide calking sleeve 7 at its upper end and a narrow calking sleeve 8 at its lower end. While being applied to the ends of the ring, the lead will flow into its peripheral grooves 2 and 3 for the purpose of anchoring thereto the respective sleeves which it forms, so that these sleeves 7 and 8 with the cast iron center 1, 1 will constitute a calking assembly that may be bodily applied to the end of a pipe section 9 for insertion in the bell end 10 of another pipe section 11.

In Figure 3 I have illustrated the pipe sections 9 and 11 about to be joined in seal-tight engagement by my calking ring. It will be observed that the inner lead sleeve end 8 of the ring occupies a position at the extreme inner end of the bell 10, while the outer sleeve end 7 of the ring projects a short distance beyond the mouth of the bell to receive the blows of a conventional peening tool (not shown). Each blow that is dealt to the outer end of the calking sleeve 7 will not only wedge it tightly between the pipe section 9 and the wall of the bell 10, but will be transmitted through the cast-iron center of the assembled ring to its inner end 7 to wedge it tightly between said pipe section and the bell at the extreme inner end of the joint. (See Figure 4). An oakum packing, for instance, could not be so tightly placed at the inner end of the joint, causing it to sag in time. But the lead formed inner end of my calking ring, when a blow is dealt its outer lead-formed end, will become so tightly compressed between the bell, the ring and the outer surface of the pipe section 9 at the inner end of the joint as to cooperate with its tightly lead-calked outer end in maintaining the connected pipe sections 9 and 11 in alinement at all times.

Having described my invention, I claim:

1. A means of calking a joint between two pipe sections, comprising a pre-cast ring having a peripheral groove near each marginal edge thereof, said edge beyond each groove tapering inwardly to provide a wedging surface, a lead sleeve applied to each end of said ring and having an annular bead resting in a respective groove to anchor the sleeve to the ring.

2. A means of calking a joint between two pipe sections, comprising a ring composed of two lead-united semi-circular pre-cast sections, one section being formed with two peripheral grooves for alinement with the corresponding grooves of the other section, the inner alined grooves being a short distance from the adjacent edge of the ring and the outer groove being a greater distance from its adjacent edge of the ring, the surface between the grooves and their respective edges tapering inwardly to provide wedging parts, and a lead sleeve applied to each end of said ring over its respective groove, the sleeve applied to the wide tapered end of the ring being the outer sleeve to receive the peening blows for transmission through the center of the ring to the lead sleeve on its inner end for the purpose of simultaneously calking the front and rear portions of said joint.

ELLSWORTH C. HALTEMAN.